United States Patent [19]

Kuroda et al.

[11] Patent Number: 4,722,068

[45] Date of Patent: Jan. 26, 1988

[54] DOUBLE PRECISION MULTIPLIER

[75] Inventors: Ichiro Kuroda; Takao Nishitani; Hideo Tanaka; Yuichi Kawakami, all of Tokyo, Japan

[73] Assignee: NEC Corporation, Tokyo, Japan

[21] Appl. No.: 727,020

[22] Filed: Apr. 25, 1985

[30] Foreign Application Priority Data

Apr. 26, 1984 [JP] Japan .................................. 59-84578

[51] Int. Cl.[4] .............................................. G06F 7/52
[52] U.S. Cl. .................................... 364/757; 364/745
[58] Field of Search ................ 364/757, 759, 760, 745

[56] References Cited

U.S. PATENT DOCUMENTS

| | | | |
|---|---|---|---|
| 3,814,924 | 6/1974 | Tate ...................................... | 364/757 |
| 4,086,657 | 4/1978 | Gaskill, Jr. et al. ................. | 364/757 |
| 4,272,827 | 6/1981 | Inui et al. ............................. | 364/745 |
| 4,507,749 | 3/1985 | Ohhashi .............................. | 364/757 |

OTHER PUBLICATIONS

Senzig, "Multiple Precision Pipelined Multiplier" *IBM Tech. Disclosure Bulletin,* vol. 10 No. 4, Sep. 1967, pp. 403-405.
Dauby et al., "Two's Complement Multiplier" *IBM Tech. Disclosure Bulletin,* vol. 18, No. 5, Oct. 1975, pp. 1482-1483.
Nishitani, et al., "A Single-Chip Digital Signal Processor for Telecommunication" Applications, IEEE Journal of Solid-State Circuits, vol. SC-16, No. 4, pp. 372-376.
McDonough, et al., "Microcomputer with 32-Bit Arithmetic does High-Precision Number Crunching", Electronics, Feb. 24, 1982, pp. 105-110.

*Primary Examiner*—David H. Malzahn
*Attorney, Agent, or Firm*—Schwartz, Jeffery, Schwaab, Mack, Blumenthal & Evans

[57] ABSTRACT

A double precision multiplyer for performing the multiplication of two double precision data using a 2's complement single precision multiplier. The $2n-1$ bit double precision data is divided into one single precision data formed by taking the upper n bits of the double precision data and another single precision data formed by adding a "0" bit before the most significant bit of the remaining $n-1$ bits of the double precision data. Apparatus for performing the double precision multiplication thereby eliminates the necessity of discriminating the sign bit and enhances the speed of the double precision multiplication.

5 Claims, 16 Drawing Figures

FIG. 1(a)
MULTIPLIER

FIG. 1(b)
MULTIPLICAND

FIG. 1(c)
PARTIAL PRODUCTS

FIG. 1(d)
PRODUCT

DOUBLE PRECISION MULTIPLIER

BACKGROUND OF THE INVENTION

1. Field of the Invention

This invention relates to a high speed double precision multiplier for performing the double precision multiplication of two double precision data using a 2's complement single precision multiplier.

2. Description of the Prior Art

In general, data of n bits (n is a natural number) is called single precision data (SP data), while data of 2n bits is called double precision data (DP data). However, it is assumed now that (2n−1)-bit data obtained by multiplying two 2's complement SP data is referred to as DP data.

To multiply two DP data in a 2's complement single precision multiplier, it is necessary to divide each DP data into two SP data.

Two methods have been proposed for the division of (2n−1)-bit DP data into the upper and lower words, or two SP data. The first method enables the division of the (2n−1)-bit DP data into the upper n-bit word and the lower n-bit word, which is obtained by adding one "0" bit after the LSB (least significant bit) of the remaining lower (n−1) bits. For example, such a method is proposed by T. Nishitani et al in an article titled "A Single-chip Digital Signal Processor for Telecommunication Applications"; published in the IEEE JOURNAL OF SOLID-STATE CIRCUITS, Vol. SC-16, No. 4, pp. 372–376, August, 1981. The second method achieves the division of the (2n−1)-bit DP data into the lower n-bit word and the upper n-bit word, which is obtained by adding the sign bit to the MSB (most significant bit) of the remaining upper (n−1) bits (See an article by K. McDonough et al titled "Microcomputer with 32-bit arithmetic does high-precision number crunching", published in the Electronics, pp. 105–110, February 24, 1982).

In both of the above-described methods, whether the MSB of the lower word becomes "0" or "1" depends on the result of the single precision multiplication. In this case, the multiplication in the 2's complement single precision multiplier with the lower word inputted is made using its input word assuming a negative number if the MSB is "1". For this reason, the sign bit of the lower word must always be discriminated so as to correct the multiplication result, thereby making the multiplication process complicated as well as requiring much time in computation.

SUMMARY OF THE INVENTION

An object of this invention is, therefore, to provide a double precision multiplier capable of performing the high-speed double precision multiplication without the above-mentioned complicated process simply by adding one "0" bit immediately before the MSB of the lower word when DP data is divided into the upper word SP data and the lower word SP data and then inputted the data into a 2's complement single multiplier.

According one aspect of the invention, there is provided a double precision multiplier, which includes: 2's complement single precision multiplication means responsive to two input data, each of which has a predetermined word length of n bits as SP data, for performing the multiplication of said two data to produce one (2n−1)-bit DP data; double precision register means having plural double precision registers for storing said DP data from said multiplication means into one of the registers specified by a first external control signal; and word selecting means responsive to a second external control signal for selecting either one SP data obtained by taking out the upper word of said DP data stored in one of the registers or one SP data obtained by adding one "0" bit before the most significant bit (MSB) of the remaining lower word of said DP data stored in one of the registers. The multiplier further includes shift means for shifting said one SP data selected by said selecting means to convert it to one DP data by expanding the MSB of the SP data ; and double precision arithmetic and logic operation means for executing an arithmetic and logic operation of said DP data with the MSB expanded and said DP data stored in one of the registers to produce a result of the arithmetic and logic operation to said register means.

BRIEF DESCRIPTION OF THE DRAWINGS

The above object and features of this invention will be made clearer from the description hereinbelow and reference made to the attached drawings in which.

In the drawings, the same reference numerals denote the same structural elements.

DESCRIPTION OF THE PREFERRED EMBODIMENTS

Referring now to FIG. 1, two DP data are multiplied by each other using a 2's complement single precision multiplier in the following manner. As shown in FIG. 1(a), a multiplier X of (2n−1)-bit DP data is divided into an upper word U(X) which comprises upper n bits including a sign bit S and a lower word L(X) obtained by adding one "0" bit before the MSB of the remaining lower (n−1) bits. Similarly, a multiplicand Y of (2n−1)-bit DP data is divided into an upper word U(Y) which comprises upper n bits including the sign bit S and a lower word L(Y) obtained by adding one "0" bit before the MSB of the remaining lower (n−1) bits as illustrated in FIG. 1(b). The upper word U(X) and the lower word L(X) of the multiplier X are multiplied by the upper word U(Y) and the lower word L(Y) of the multiplicand Y, respectively, to obtain partial products PP1 through PP4 as shown in FIG. 1(c). A partial product PP1 is formed with (4n−3) bits obtained by expanding the sign bit (constantly at "0") of the product M1 of the lower word L(X) and the lower word L(Y) by (2n−2) bits upward. A partial product PP2 is formed with ((4n−3) bits obtained by shifting the product M2 of the lower word L(X) and the upper word U(Y) by (n−1) bits upward, inserting (n−1) "0" bits after the product M2 and expanding the sign bit S by (n−1) bits upward. A partial product PP3 is formed with (4n−3) bits obtained by shifting the product M3 of the upper word U(X) and the lower word L(Y) by (n−1) bits upward, inserting (n−1) "0" bits after the product M3 and expanding the sign bit S by (n−1) bits upward. A partial product PP4 is formed with (4n−3) bits obtained by shifting the product M4 of the upper word U(X) and the upper word U(Y) by (2n−2) bits upward, and inserting (2n−2) "0" bits after the product M4. Since the double precision multiplication of two (2n−1)-bit (sign bit +(2n−2) bits) DP data makes (4n−3)-bit (sign bit +(4n−4) bits) data the digits of the PP1 through the PP4 should be (4n−3) bits.

Figure 1A:
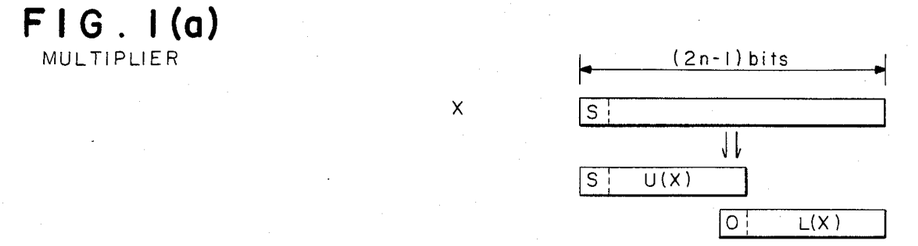
FIGS. 1(a)–1(d) are conceptual views of the double precision multiplication utilized in the invention.
Figure 1B:
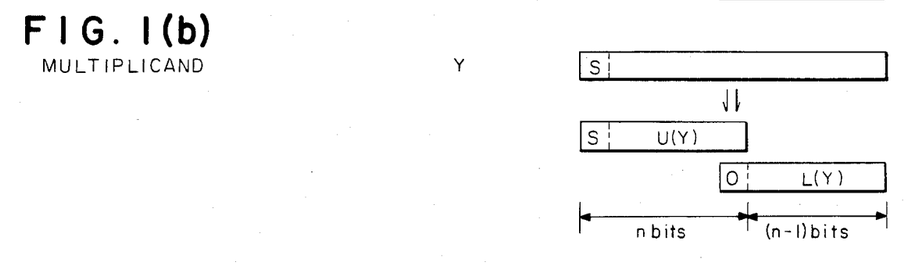
Figure 1C:
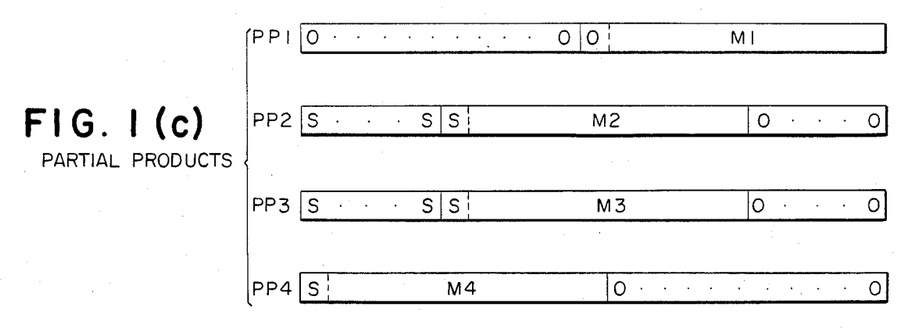
Figure 1D:
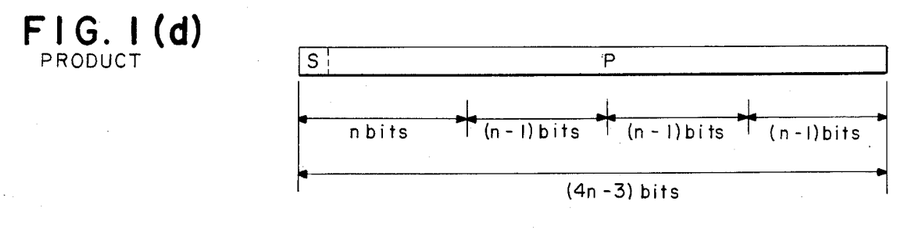

The product P of the multiplier X and the multiplicand Y may be obtained by adding the PP1 through the PP4 as illustrated in FIG. 1(d).

Figure 2:
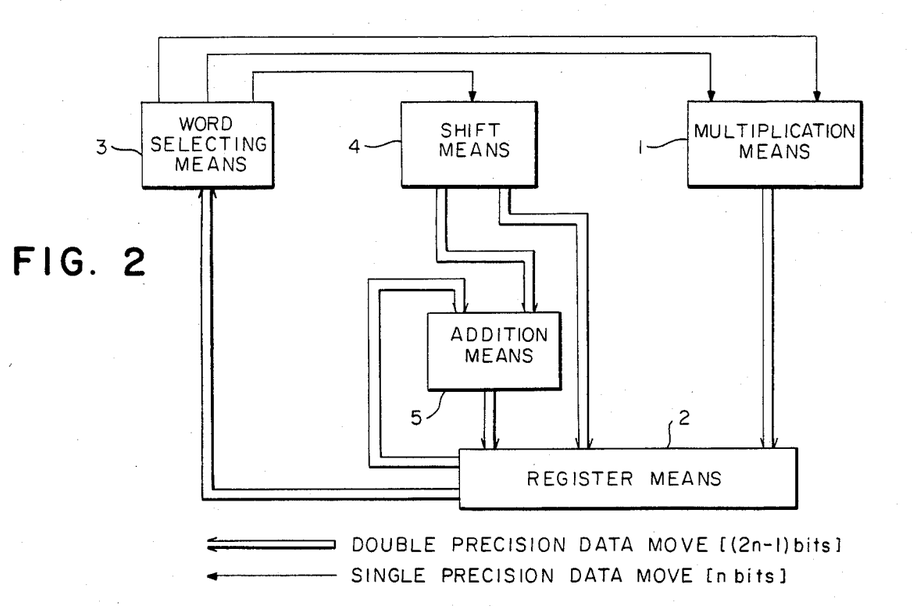
FIG. 2 is a block diagram of a basic structure of a double precision multiplier of the invention.

Referring now to FIG. 2, the basic structure of the invention based upon the above-mentioned operation principle is described below. The double precision multiplier of the invention includes multiplication means 1 responsive to two input data, each of which has a predetermined word length of n bits as SP data, for performing the multiplication of said two data to produce one (2n−1)-bit DP data; register means 2 having plural double precision registers for storing said DP data from the multiplication means into one of the registers specified by a first external control signal; and word selecting means 3 responsive to a second external control signal for selecting either one SP data obtained by taking out the upper word of said DP data stored in one of the registers or one SP data obtained by adding one "0" bit before the most significant bit (MSB) of the remaining lower word of said DP data stored in one of the registers. The multiplier further includes shift means 4 for shifting said one SP data selected by said word selecting means 3 to convert it to one DP data by expanding the MSB of the SP data; and addition means 5 for performing the addition of said DP data with the MSB expanded and said DP data stored in one of the registers to produce an addition result to said register means 2 when necessary.

Such a double precision multiplier may be installed within a digital signal processor (not shown).

Figure 3:
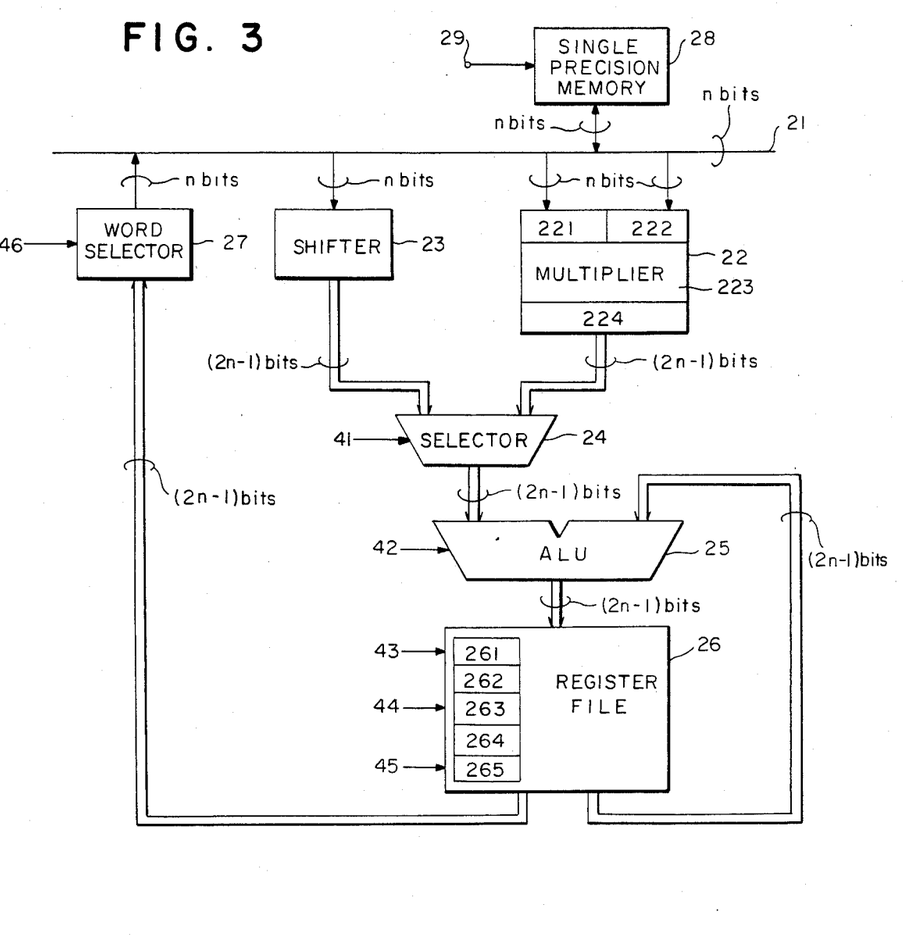
FIG. 3 is a block diagram of a first embodiment of the invention.

Referring now to FIG. 3, the first embodiment of the invention includes an internal data bus 21, a single precision multiplier 22, a shifter 23, a selector 24, a double precision arithmetic and logic unit (ALU) 25, a register file 26, a word selector 27 and a single precision memory 28.

Figure 7A:
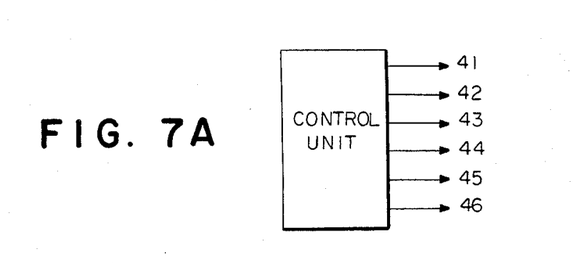
FIG. 7A is a block diagram of an external control unit.
Figure 7B:
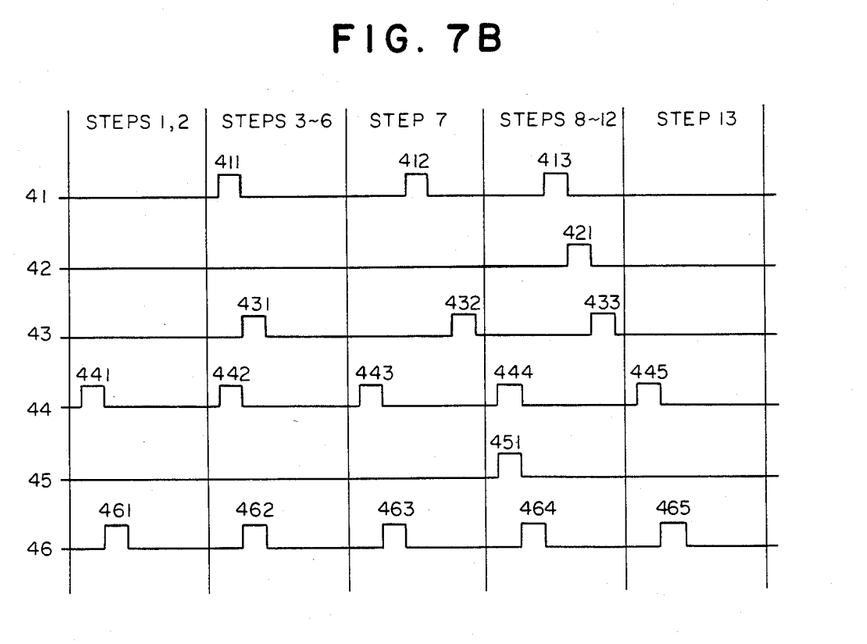
FIG. 7B is a timing chart of control signals generated from the unit of FIG. 7A.

External control signals 41 through 46 are provided from an external control unit shown in FIG. 7A. Also, details of those signals are shown in FIG. 7B.

The internal data bus 21 is a SP data bus having the bit width of n bits.

The single precision multiplier 22 comprises two input registers 221 and 222, one multiplying circuit 223 and one output register 224. The multiplier 22 is a 2's complement single precision multiplier corresponding to the multiplication means 1 shown in FIG. 2. The multiplier 22 is connected to the bus 21 at the registers 221 and 222. The circuit 223 produces a double precision product of (2n−1) bits to the register 224. This structure may be composed of a parallel array multiplier of the type disclosed in U.S. Pat. No. 3,866,030 issued on Feb. 11, 1975 to Baugh et al.

Figure 4:
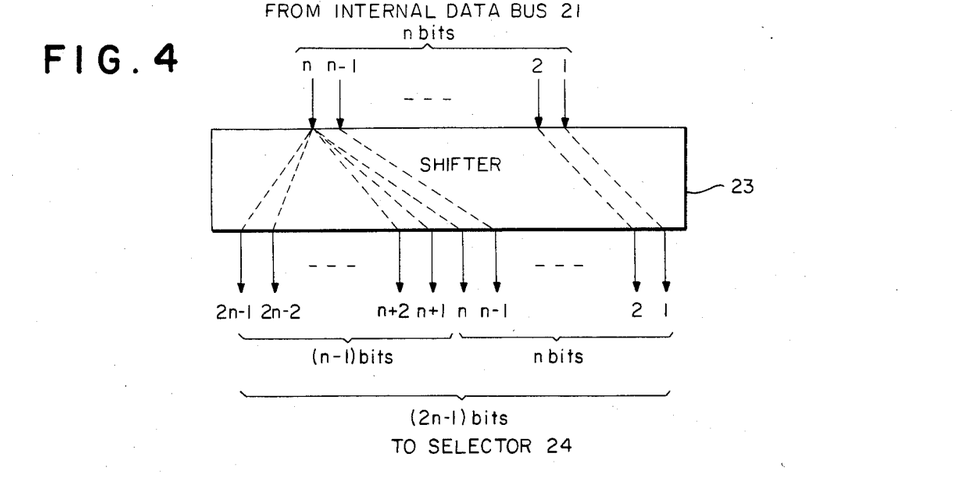
FIG. 4 is a view for describing a function of a shifter 23 shown in FIG. 3.

As shown in FIG. 4, the shifter 23 is a circuit corresponding to the shift means 4 shown in FIG. 2. The shifter 23 is connected to the bus 21 at the input thereof for expanding the MSB of the input SP data by (n−1) bits upward to make it DP data ((2n−1) bits) and outputting the same to the selector 24.

The selector 24 is a circuit responsive to the signal 41 for selecting either one of the output of the multiplier 22 or the output of the shifter 23 to feed it to the ALU 25. The selector 24 may be composed of a (2n−1)-bit selector.

The ALU 25 is (2n−1)-bit adder corresponding to the addition means 5 shown in FIG. 2. The ALU 25 performs the addition of the output of the selector 24 and the output of the one of the five registers 261 through 265 (which will be described hereinafter) in response to the signal 42. When the signal 42 is not received at the ALU 25, the output of the selector 24 is outputted from the ALU 25 to the register file 26 as it is (i.e. without modification).

The register file 26 corresponding to the register means 2 shown in FIG. 2 may be structured with five double precision registers 261, 262, 263, 264 and 265 for storing the output of the ALU 25 into one of the registers specified by one of the signals 43, 44 and 45. In response to the signal 43, one register is specified out of the registers 261 to 265 to store DP data from the ALU 25 in the selected register. In response to the signal 44, one register is specified out of the registers 261 to 265 to output DP data stored in the selected register to the word selector 27. In response to the signal 45, one register is specified out of the registers 261 to 265 to output DP data stored in the selected register to the ALU 25.

Figure 5:
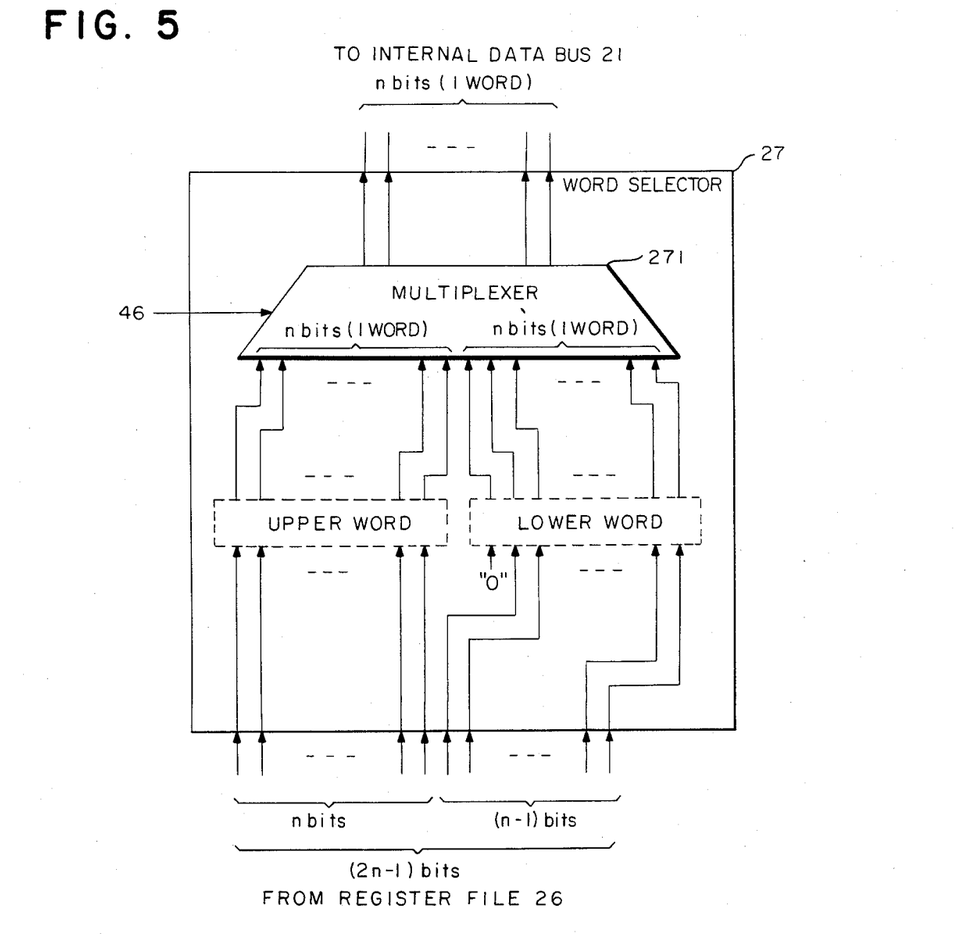
FIG. 5 is a detailed block diagram for partially illustrating the first embodiment of the invention.

The word selector 27 corresponding to the word selecting means 3 shown in FIG. 2 and, as shown in FIG. 5, may be constructed with a multiplexer 271. In response to the signal 46 and input DP data from the double precision register selected from the register file 26, the word selector 27 selects either one of the SP data of the upper n bits thereof or the SP data of the remaining lower (n−1) bits added by one "0" bit before the MSB to produce the selected data to the bus 21.

The single precision memory 28 for storing a part of the product P is structured with a random access memory of plural words and of n bits connected to the bus 21.

The double precision multiplier can achieve the following functions in parallel by one machine cycle:

(1) Two SP data respectively stored in the registers 221 and 222 are multiplied by the multiplier 22 and stored in the register 224 as one DP data.

(2) Either the upper word of the DP data stored in one register selected out of the register file 26 or the lower word added by one "0" bit before the MSB thereof is selected by the word selector 27 so that the selected word as SP data is given to the bus 21. The SP data is shifted to convert itself to one DP data by the shifter 23 and fed to the selector 24. Either the output of the shifter 23 or the output of the multiplier 22 (which is a result of the multiplication executed at the preceding machine cycle) is selected to be given to the ALU 25 by the selector 24. Either the output of the selector 24 as it is or the addition result of the output of the selector 24 and the output of one register selected out of the register file 26 is outputted to the register file 26 by the ALU 25. The output of the ALU 25 is stored in one register selected out of the five registers by the register file 26. Thus obtained SP data is fed through the bus 21 to the shifter 23 and, at the same time, to either one of the input registers 221 and 222 or the memory 28.

(3) The address of the memory 28 used for the next machine cycle is specified from a port 29.

The double precision multiplication by the above-mentioned double precision multiplier will now be described referring to FIGS. 3, 6A through 6C and 7B. The DP data of the multiplier X and multiplicand Y are fed to the registers 261 and 262 of the register file 26, respectively.

(STEP 1)

At the first step (the machine cycle), in response to a signal 461 (FIG. 7B), the lower word L(X) of the multiplier X (which means hereinafter a n-bit data obtained by adding one "0" bit before the MSB of the lower (n−1) bits), which has been stored in the register 261 specified by a signal 441 (FIG. 7B), is selected by the word selector 27 and inputted into the register 221 of the multiplier 22.

(STEP 2)

The lower word L(Y) of the multiplicand Y stored in the register 262 is selected by the word selector 27 and fed to the register 222.

The control signals 441 and 461 are fed to the register file 26 and shown in FIG. 7B and as described in word selector 27 in the same timing as the STEP 1.

(STEP 3)

The register 224 of the multiplier 222 which has stored the product M1 of the lower word L(X) and the lower word L(Y) is selected by the selector 24 in response to a signal 411. The output of the register 224 is fed into the register 263 specified by a signal 431 of the register file 26 without addition by the ALU 25.

In response to a signal 462, the upper word U(Y) of the multiplicand Y stored in the register 262 specified by a signal 442, is selected by the word selector 27 to be given to the register 222.

In STEPs 4 to 6 described hereinafter, the control signals 411, 431, 442 and 462 are given to the selector 24, the register file 26 and the word selector 27 in the same timed relationship with the STEP 3.

(STEP 4)

The output register 224 of the multiplier 22 which has stored the product M2 of the lower word L(X) and the upper word U(Y) is selected by the selector 24. The output of the register 224 is inputted into the register 264 of the register file 26 without addition by the ALU 25. The upper word U(X) of the multiplier X stored in the register 261 is selected by the word selector 27 and supplied to the register 221.

(STEP 5)

The register 224 of the multiplier 22 which has stored the produce M4 of the upper word U(X) and the upper word U(Y) is selected by the selector 24. The output of the register 224 is inputted into the register 265 without addition by the ALU 25. The lower word L(Y) of the multiplicand Y stored in the register 262 is selected by the word selector 27 to be given into the register 222.

The address of the memory 28 for use at the next step is specified from the port 29.

(STEP 6)

The lower word L(M1) of the product M1 stored in the register 263 is selected by the word selector 27 and stored in the memory 28. This is SP data P1 obtained by adding one "0" bit before the MSB of the least significant (n−1) bits of the product P of the double precision multiplication. The output of the multiplier 22 indicating the product M3 of the upper word U(X) and the lower word L(Y) is selected by the selector 24 and fed into the register 262 of the register file 26 as it is without addition by the ALU 25.

(STEP 7)

Figure 6A:
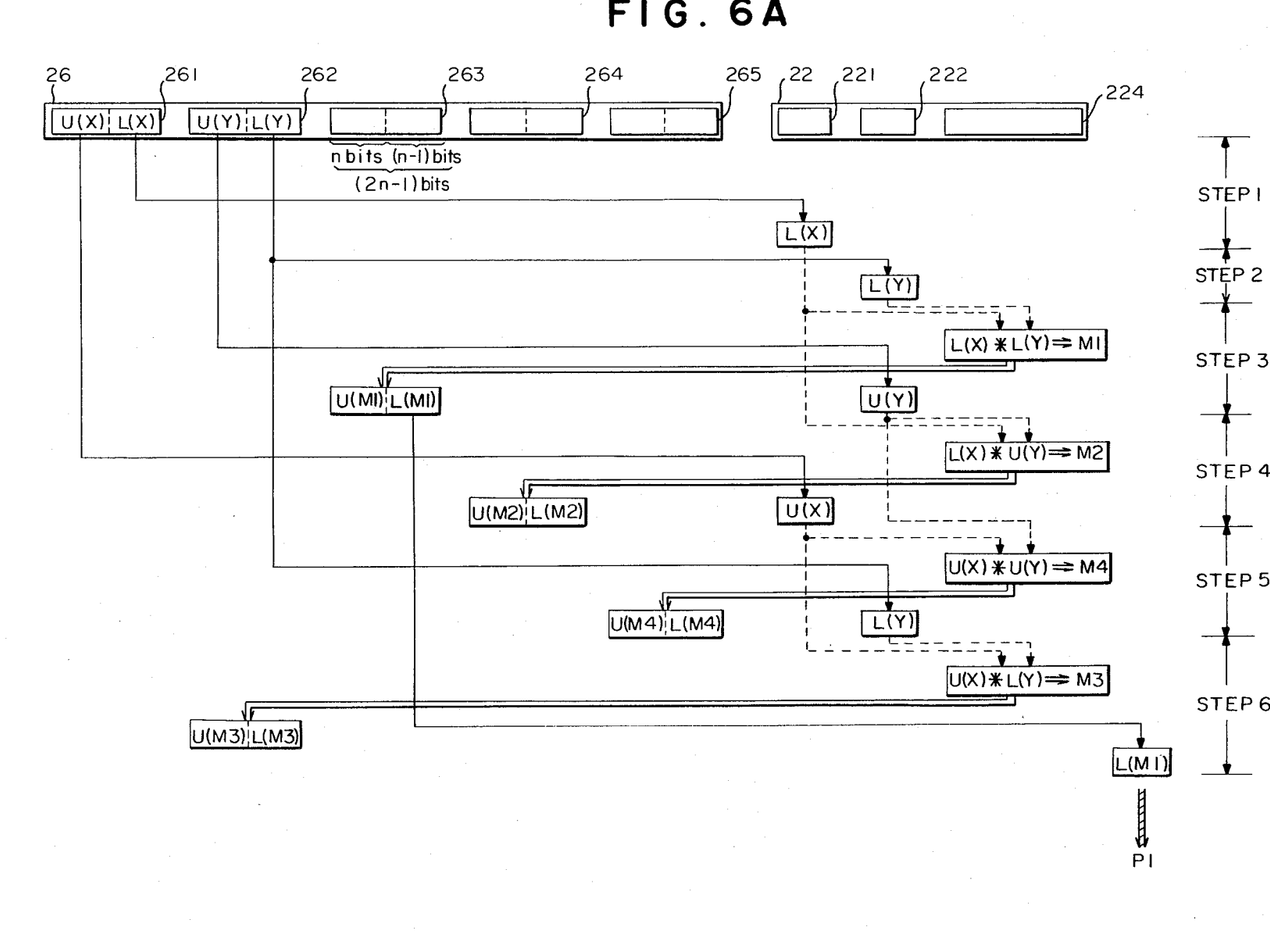
FIGS. 6A through 6C are views for describing a double precision multiplication process according to the first embodiment of the invention.
Figure 6B:
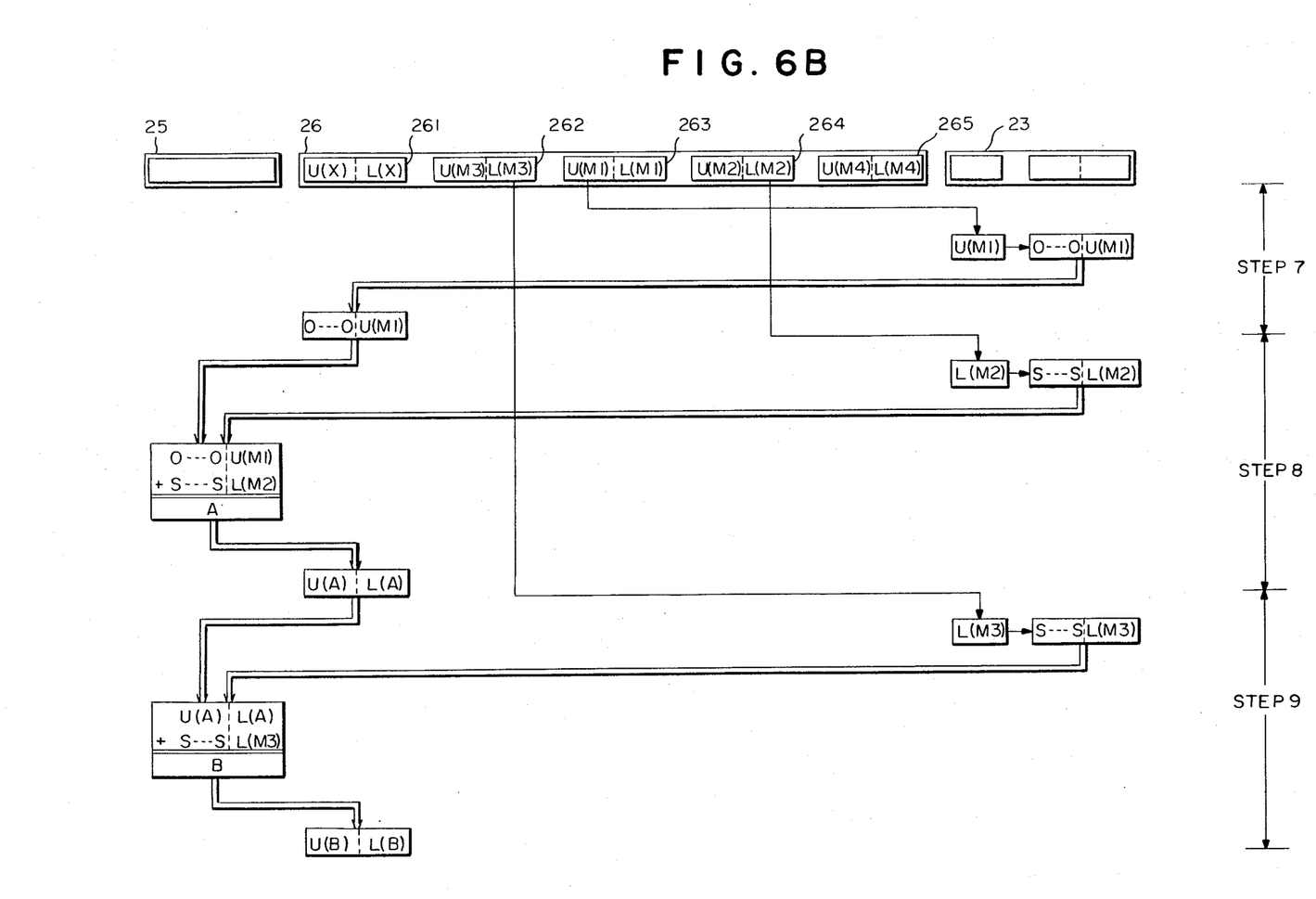

Referring to FIG. 6B, in response to a signal 463, the upper word U(M1) of the product M1 stored in the register 263 specified by a signal 443 is selected by the word selector 27 and converted to one DP data by expanding the MSB (constantly at "0") by the shifter 23. In response to a signal 412, the upper word U(M1) with MSB expanded is selected by the selector 24, and inputted into the register 261 specified by a signal 432 of the register file 26 without addition by the ALU 25.

(STEP 8)

In response to a signal 464, the lower word L(M2) of the product M2 which has been stored in the register 264 specified by a signal 444 is selected by the selector 27, converted to one DP data by expanding the MSB S by the shifter 23. In response to a signal 413, the lower word L(M2) with MSB expanded is selected by the selector 24, and added by the ALU 25 by a signal 421 to the register 261 specified by signals 451 and 433 which stores the upper word U(M1) of the product M1 with its MSB ("0") expanded. The resultant DP data of this addition is referred to as A.

In STEPs 9 to 12 described hereinafter, the control signals 413, 421, 433, 444, 451 and 464 are given to the structural elements 24, 25, 26 and 27 in the same timed relationship with the STEP 8.

(STEP 9)

The lower word L(M3) of the product M3 stored in the register 262 is selected by the word selector 27, converted to one DP data by expanding the MSB S by the shifter 23, selected by the selector 24, and added by the ALU 25 to the register 261 which stores the addition result A. The resultant DP data of the addition is referred to as B herein.

(STEP 10)

Figure 6C:
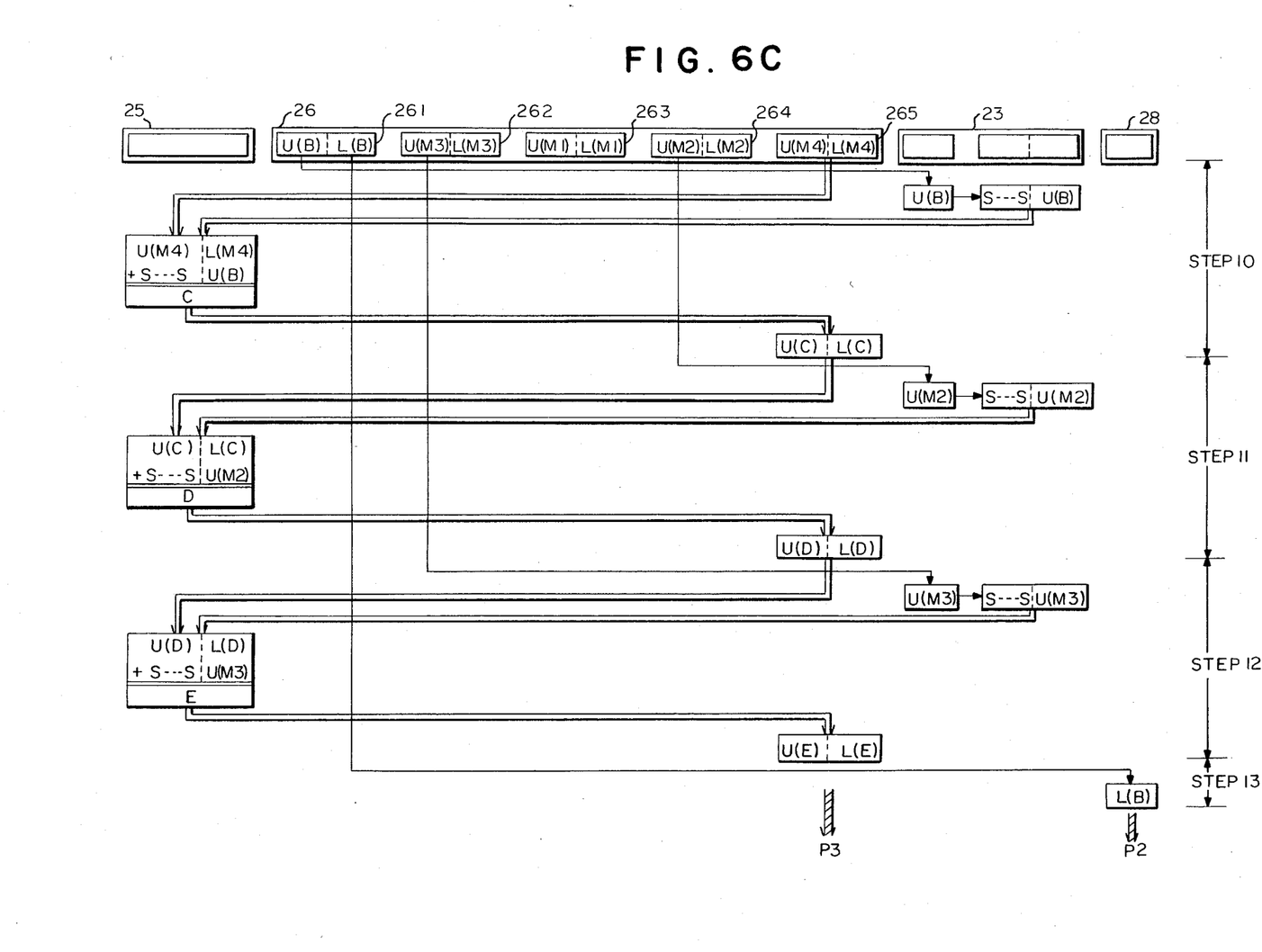

Referring to FIG. 6C, the upper word U(B) of the addition result B stored in the register 261 is selected by the word selector 27, converted to one DP data by expanding the MSB S by the shifter 23, selected by the selector 24, and added by the ALU 25 to the register 265 which stores the product M4. The resultant DP data of the addition is referred to as C herein.

(STEP 11)

The upper word U(M2) of the product M2 stored in the register 264 is selected by the word selector 27, converted to one DP data by expanding the MSB S by the the shifter 23, selected by the selector 24 and added by the ALU 25 to the register 265 which stores the addition result C. The resultant DP data of this addition is referred to as D herein.

(STEP 12)

The upper word U(M3) of the product M3 stored in the register 262 is selected by the word selector 27, converted to one DP data by expanding the MSB S by the shifter 23, selected by the selector 24 and added by the ALU 25 to the register 265 which stores the addition result D. The resultant DP data of the addition is referred to as E herein. The address of the memory 28 for use at the next step is specified from the port 29.

(STEP 13)

In response to a signal 465, the lower word L(B) of the addition result B stored in the register 261 specified by a signal 445 is selected by the word selector 27, and stored in the memory 28. This will become SP data P2 obtained by adding one "0" bit before the MSB of the (n−1) bits extending from the n-th bit from the LSB of the product P to the (2n−2)-th bit thereof. The upper word U(B) of the addition result B represents a carry from the lower (2n−1) bits to the upper (2n−2) bits of the product P. The addition result E obtained at the STEP 12 is DP data P3 of upper (2n−1) bits of the product P.

As mentioned above, the product P is divided into the data P1, P2 and P3 and stored in a single precision memory or a double precision register.

Figure 8:
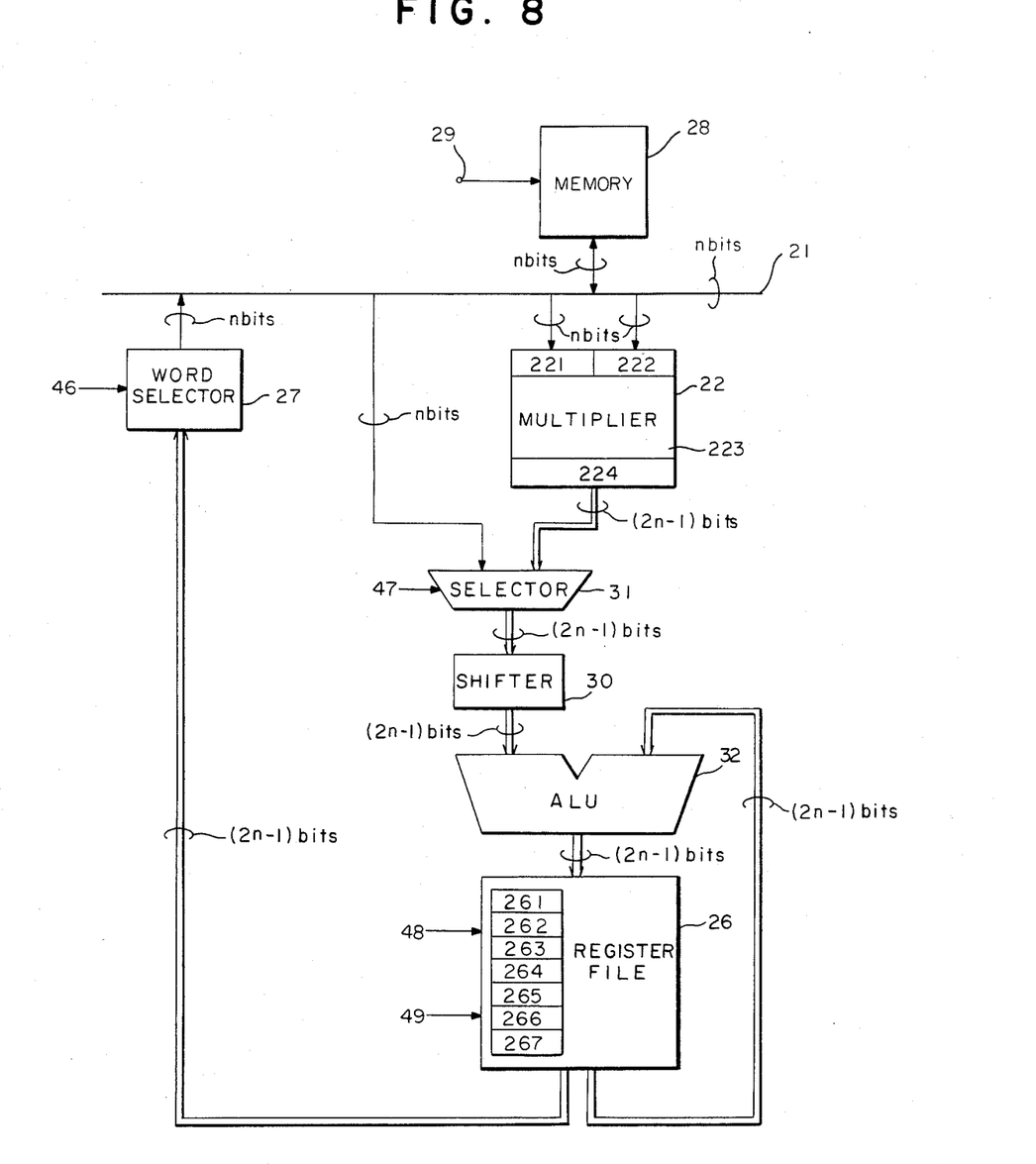
FIG. 8 is a block diagram of a second embodiment of the invention.

Referring now to FIG. 8, the second embodiment of the invention is described. In this embodiment, the internal data bus 21, the single precision multiplier 22, the word selector 27 and the single precision memory 28 are identical to those described in relation to the first embodiment.

Figure 9A:
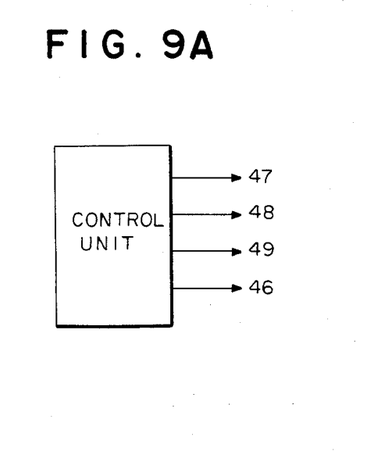
FIG. 9A is a block diagram of another external control unit.

External control signals 46 through 49 are provided from an external control unit shown in FIG. 9A.

The register file 26 has seven double precision registers 261 through 267. In response to the signal 48, one register is specified out of the registers 261 through 267 to output DP data stored in the specified register to the word selector 27. In response to the signal 49, one register is specified out of the registers 261 through 271 to output DP data stored in the specified register to the ALU 32 and store the DP data from the ALU 32 which is the addition result of the output of the shifter 30 and the output of said specified register.

A selector 31 receives as inputs one SP data from the bus 21 and one DP data from the multiplier 22 while the SP data is added with "0" of (n−1) bits at the lower order thereof either inside of the selector 31 or at the input section to form one DP data. Either one of the DP data from the multiplier 22 or the DP data with "0" added is selected by the signal 47 to be produced to a shifter 30.

The shifter 30 is a circuit which can shift the output of the selector 31 by an arbitrary number of bits in an arbitrary direction. It can also output without shifting at all. The selector 31 and the shifter 30 correspond to the shifting means 4 shown in FIG. 2.

A double precision ALU 32 is a double precision adder which corresponds to the addition means 5 shown in FIG. 2. The ALU 32 adds the output of the shifter 30 and the output of one register selected out of the seven registers 261 through 267 for output.

Figure 9B:
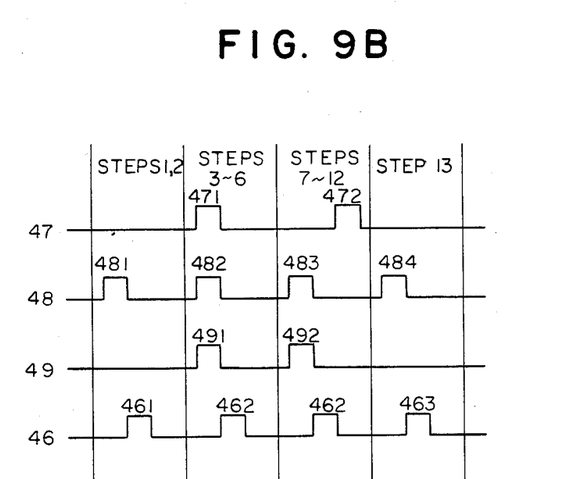
FIG. 9B is a timing chart of control signals generated from the unit of FIG. 9A.

The double precision multiplication in the second embodiment will now be described with reference to FIGS. 8, 9A and 9B. The DP data of the multiplier X and the multiplicand Y are stored in the registers 261 and 262 of the register file 26 while the other registers 263 through 267 store "0" at all bits. Explanation will be given only to the steps of the double precision multiplication process which are different from the process of the first embodiment.

(STEPS 1 and 2)

The STEPs 1 and 2 are identical to those of the first embodiment. In response to a signal 481, one register is specified out of the registers 261 to 267. In response to a signal 461, the word selector 27 selects one word out of the DP data stored in the specified register.

(STEP 3)

In response to a signal 471, the product M1 stored in the register 224 of the multiplier 22 is selected by the selector 31 without being shifted by the shifter 30. The product M1 is added to the content of the register 263 ("0") specified by a signal 491 which have been given from the register file 26 by the ALU 32. The resultant DP data of this addition is stored in the register 263. The multiplicand Y stored in the register 262 specified by a signal 482 is given to the word selector 27. The word selector 27 selects the upper word U(Y) of the multiplicand Y upon receipt of a signal 462 to give the upper word U(Y) to the register 222.

In STEPs 4 to 6 described hereinafter, the control signals 462, 471, 482 and 491 are given to the structural elements 31 and 27 in the same timing as the STEP 3.

(STEPS 4 and 5)

The product M2 and M4 stored in the output register 224 of the multiplier 22 are respectively selected by the selector 31, but not shifted by the shifter 30. They are, respectively, added to each of the contents of the registers 264 and 265 (all are "0") which have been inputted from the register file 26 by the ALU 32. The resultant DP data of this addition is stored, respectively, in the registers 264 and 265.

(STEP 6)

The product M3 stored in the register 224 of the multiplier 22 is selected by the selector 31, but not shifted by the shifter 30. It is added to the content of the register 266 ("0") given from the register file 26 by the ALU 32 and stored in register 266.

(STEP 7)

The product M1 stored in the register 263 specified by a signal 483 is outputted to the word selector 27. The word selector 27 selects the upper word U(M1) of the product M1 by a signal 463. The upper word U(M1) is connected to one DP data by adding (n−1) "0" bits after the LSB by the selector 31. The DP data thus formed is selected by the selector 31 by a signal 472 and shifted by the shifter 30 downward by (n−1) bits for output. The DP data is added by the ALU 32 to the content of the register 267 (all are "0") which has been specified by a signal 492 supplied from the register file 26. The resultant DP data of this addition is stored in the register 267. The DP data stored in the register 267 is, therefore, the upper word U(M1) of the product M1 with the MSB thereof (constantly at "0") expanded.

In STEPs 8 to 12, the control signals 463, 472, 483 and 492 are given to the structural elements 26, 27 and 31 in the same timing as the STEP 7.

(STEPS 8 and 9)

The lower words L(M2) and L(M3) of the product M2 and M3 stored, respectively, in the registers 264 and 265 are selected by the word selector 27 and added with (n−1) "0" bits after the LSB of the lower words L(M2) and L(M3) by the selector 31 to convert to DP data thereof. The lower words L(M2) and L(M3) with (n−1) "0" bits added are shifted downward by (n−1) bits and added by the ALU 32 respectively to the contents of the register 267 given from the register file 26 and stored in the register 267. The addition result is referred to as B herein.

(STEP 10)

The upper word U(B) of the addition result B stored in the register 267 is selected by the word selector 27 and added by (n−1) "0" bits after the LSB of the upper word U(B) by the selector 31 to select the DP data thereof. The upper word U(B) with (n−1) "0" bits added is shifted downward by (n−1) bits by the shifter 30 and added with the content of the register 265, which stores the product M4 given from the register file 26 by the ALU 32, and stored in the register 265. The addition result is referred to as C herein.

(STEP 11)

The upper word U(M2) of the product M2 stored in the register 264 is selected by the word selector 27 and added by (n−1) "0" bits after the LSB of the upper word U(M2) by the selector 31 to select the DP data thereof. The upper word U(M2) with (n−1) "0" bits added is shifted downward by (n−1) bits by the shifter 30 and added with the content of the register 265, which stores the addition result C given from the register file 26 by the ALU 32, and stored in the register 265. The addition result is referred to as D herein.

(STEP 12)

The upper word U(M3) of the product M3 stored in the register 266 is selected by the word selector 27 and added by (n−1) "0" bits after the LSB of the upper word U(M3) by the selector 31 to select the DP data thereof. The upper word U(M3) is shifted downward by (n−1) bits by the shifter 30 and added with the content of the register 265, which stores the addition result D fed from the register file 26 by the ALU 32, and stored in the register 265. The addition result is referred to as E herein.

(STEP 13)

In response to a signal 464, the lower word L(B) of the addition result B stored in the register 267 specified by a signal 484 is selected by the word selector 27. The lower word L(B) is stored in the memory 28. This becomes therefore SP data P2 formed by adding one "0" bit before the MSB of the (n−1) bits extending from the n-th bit from the LSB to the (2n−2)-th bit of the product P of the double precision multiplication. The data P1 and P3 may be obtained through the steps similar to the first embodiment.

By the above described procedure, the data on each portion P1, P2 and P3 of the product P can be obtained.

As described in the foregoing statement, when (2n−1) bit DP data which is the multiplication result of two n-bit SP data is divided into two SP data, this invention employs the step to divide it into one SP data formed by taking the upper n bits out of the original DP data and one SP data formed by adding one "0" bit before the MSB of the remaining lower (n−1) bits, thereby making the step of discriminating the sign bit unnecessary and hence, enhancing the speed of the double precision multiplication.

What is claimed is:

1. A double precision multiplier including:
    2's complement single precision multiplication means responsive to two input data, each of which has a predetermined word length of n bits where n bits corresponds to single precision data, for performing the multiplication of said two data to produce one (2n−1)-bit double precision data, each double precision data having an upper word and a lower word;
    double precision register means having plural double precision registers for storing said double precision data from said multiplication means into one of the registers;
    word selecting means for selecting either one single precision data obtained by taking out the upper word of said double precision data stored in one of the registers of said register means or one single precision data obtained by adding one "0" bit before the most significant bit (MSB) of the remaining lower word of said double precision data stored in one of the registers of said register means;
    shift means connected to receive said selected one single precision data for shifting said one single precision data selected by said selecting means to convert it to one double precision data by expending the MSB of the selected one single precision data; and
    double precision arithmetic and logic operation means connected to receive said one double precision data with the MSB expanded from said shift means and said double precision data stored in said double precision registers of said register means for executing an arithmetic and logic operation of said double precision data with the MSB expanded and said double precision data stored in one of the registers to feed a result of the arithmetic and logic operation to said register means.

2. A double precision multiplier as recited in claim 1, further including a data bus connected to said word selecting means and said shift means.

3. A double precision multiplier as recited in claim 2, wherein said data bus is further connected to said multiplication means.

4. A double precision multiplier as recited in claim 1, further comprising a selector having inputs connected to receive the one double precision data with the MSB expanded from said shift means and double precision data from said multiplication means, said selector passing one of its inputs to said arithmetic and logic operation means.

5. A double precision multiplier as recited in claim 1, further comprising a selector having inputs connected to receive the one single precision data selected by said word selecting means and double precision data from said multiplication means, said selector passing one of its inputs to said shift means.

* * * * *